US012747032B2

(12) United States Patent
Schmidt et al.

(10) Patent No.: US 12,747,032 B2
(45) Date of Patent: Sep. 29, 2026

(54) OPTICAL MEASUREMENT SYSTEM TO LAND AN AERIAL VEHICLE

(71) Applicant: Lockheed Martin Corporation, Bethesda, MD (US)

(72) Inventors: Timothy Schmidt, Port St. Lucie, FL (US); Roderick S. Duplin, Jupiter, FL (US); Robert S. Takacs, Oxford, CT (US); Karl B. Scherer, Jupiter, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 168 days.

(21) Appl. No.: 18/535,121

(22) Filed: Dec. 11, 2023

(65) Prior Publication Data

US 2025/0187752 A1 Jun. 12, 2025

(51) Int. Cl.

*B64D 45/08* (2006.01)
*B64C 29/00* (2006.01)
(Continued)

(52) U.S. Cl.

CPC ................ *B64D 45/08* (2013.01); *G06T 7/73* (2017.01); *G06T 11/00* (2013.01); (Continued)

(58) Field of Classification Search

CPC ........... B64D 45/08; G06T 7/73; G06T 11/00; G06T 2207/10032; G06T 2207/30261; (Continued)

(56) References Cited

U.S. PATENT DOCUMENTS

| | | | |
|---|---|---|---|
| 7,642,929 B1 | 1/2010 | Pinkus et al. | |
| 8,554,395 B2 | 10/2013 | Anderson | |

(Continued)

FOREIGN PATENT DOCUMENTS

| | | |
|---|---|---|
| CN | 109712185 B | 11/2022 |
| CN | 116185049 A | 5/2023 |

OTHER PUBLICATIONS

Extended European Search Report on European Patent Application No. 24216789.8 dated Apr. 14, 2025 (12 pages).

(Continued)

*Primary Examiner* — Anne Marie Antonucci
*Assistant Examiner* — Luis G Del Valle
(74) *Attorney, Agent, or Firm* — Foley & Lardner LLP

(57) ABSTRACT

Aerial navigation is disclosed. A system can receive, via a camera coupled to the aerial vehicle, image frames of a platform. The system can generate, via a first model trained with machine learning on reference patterns, a feature map that identifies a predetermined pattern. The system can input, responsive to recognition of the predetermined pattern, a feature map generated by the first model into a second model trained with machine learning on slope-intercept functions. The system can determine, based on an offset of the zone in the image frame and the orientation of the aerial vehicle relative to the zone, a vector between the aerial vehicle and the zone. The system can provide for display, via a display device communicatively coupled to the computing system, an indication of the vector overlayed on a digital representation of the image frame.

20 Claims, 8 Drawing Sheets

500

(51) Int. Cl.
*G06T 7/73* (2017.01)
*G06T 11/00* (2026.01)
*G06V 10/77* (2022.01)
*G06V 20/17* (2022.01)
*G06V 20/58* (2022.01)

(52) U.S. Cl.
CPC .......... *G06V 10/7715* (2022.01); *G06V 20/17* (2022.01); *G06V 20/58* (2022.01); *B64C 29/0008* (2013.01); *G06T 2207/10032* (2013.01); *G06T 2207/30261* (2013.01)

(58) Field of Classification Search
CPC .... G06V 10/7715; G06V 20/17; G06V 20/58; B64C 29/0008
See application file for complete search history.

(56) References Cited

U.S. PATENT DOCUMENTS

| | | | | |
|---|---|---|---|---|
| 9,639,088 | B2 | 5/2017 | Wang et al. | |
| 2015/0314885 | A1 | 11/2015 | Zhang | |
| 2016/0306363 | A1* | 10/2016 | Wang | B64C 27/04 |
| 2017/0102713 | A1* | 4/2017 | Lim | B63B 35/50 |
| 2018/0009546 | A1* | 1/2018 | Filias | B64C 13/18 |
| 2019/0197908 | A1 | 6/2019 | Mozer et al. | |
| 2020/0217967 | A1* | 7/2020 | Stoschek | G01S 7/484 |
| 2020/0410874 | A1* | 12/2020 | Jensen | G08G 5/727 |
| 2024/0248470 | A1* | 7/2024 | Montoya | G05D 1/0038 |

OTHER PUBLICATIONS

Rodriguez-Ramos et al., “Towards Fully Autonomous Landing on Moving Platforms for Rotary Unmanned Aerial Vehicles”, 2017 International Conference on Unmanned Aircraft Systems (ICUAS), IEEE, Jun. 13, 2017, pp. 170-178.

Sanchez-Lopez et al., “An Approach Toward Visual Autonomous Ship Board Landing of a VTOL UAV”, Journal of Intelligent, vol. 74, No. 1-2, Oct. 5, 2013, pp. 113-127.

Yong et al., “A New Vision-based Method of Autonomous Landing for UAVs”, 2023 9th International Conference on Electrical Engineering, Control and Robotics (EECR), IEEE, Feb. 24, 2023, pp. 1-6.

He et al., “A New Vision-based Method of Autonomous Landing for UAVs”, 2023 9th International Conference on Electrical Engineering, Control and Robotics (EECR), IEEE, Feb. 24, 2023, pp. 57-62.

* cited by examiner

202

OPTICAL MEASUREMENT SYSTEM TO LAND AN AERIAL VEHICLE

FIELD OF THE DISCLOSURE

This disclosure relates to sensor-based navigation of aerial vehicles.

BACKGROUND

Aerial vehicles, such as helicopters, can land on platforms, such as helipads, on moving vehicles, runways, or structures. However, it can be challenging to maneuver an aerial vehicle with respect to locations which are disposed below the aerial vehicles.

SUMMARY

Technical solutions of this disclosure are directed using optical measurements to land an aerial vehicle by providing a cue to a pilot of the aerial vehicle, autonomously land the aerial vehicle, or perform a flight test. A pilot can maneuver an aerial vehicle, such as a helicopter, with respect to a point of interest disposed under the aerial vehicle. Such a point of interest can include a platform for landing the aerial vehicle (e.g., a helipad), or a hoist rescue swimmer. Maneuvering in relation to the point of interest can be challenging, since visual or sensor-based observation may be limited (e.g., occluded by the floor of an aircraft, or lagging according to a sampling rate for sensor data). For example, following a takeoff of a vertical takeoff or landing vehicle (VTOL), a detected condition can indicate that the VTOL vehicle should return to the platform, which is obscured. An extension of flight time to re-approach the platform may be counter-indicated by the condition. An optical measurement and cuing system, according to the present disclosure, can provide an input to aid in the navigation (e.g., to a human pilot or an autonomy system). For example, the input can include a representation of the platform, or a vector between the aerial vehicle and the platform, such as a visual display.

Instances of the technical solutions can detect a point-of-interest (e.g., a reference pattern corresponding to a location at which to land the aerial vehicle) in image data detected by a camera or another sensor of the aerial vehicle. A data processing system can process the image data to determine a vector between the aerial vehicle and the platform. For example, the data processing system can determine the vector based on applying a transformation to the image data, and determining a relative position between the aerial vehicle and the transformation of the image data. The representation of the predefined pattern can include image data (e.g., a camera feed) or another representation. For example, the representation can include a data array for a vector configured for input to an autonomy system. Based on the transformed image data, the data processing system can determine a relative attitude between the aerial vehicle and the platform or a three-dimensional position of the aerial vehicle with respect to the platform. Such a position may include an input from a camera, or any number of other sensors (e.g., an altimeter, inertial navigation system, global positioning system, or so forth).

An aspect of the present disclosure can relate to a system. The system can include one or more processors coupled to memory. The system can receive, via a camera coupled to the aerial vehicle, image frames captured by the camera of the platform on which to land the aerial vehicle. The system can generate, via a first model trained with machine learning on reference patterns, a feature map that identifies a predetermined pattern in an image frame of the frames that corresponds to a zone on the platform on which to land the aerial vehicle. The system can input, responsive to recognition of the predetermined pattern, the feature map generated by the first model into a second model trained with machine learning on slope-intercept functions to output an orientation of the aerial vehicle relative to the zone. The system can determine, based on an offset of the zone in the image frame and the orientation of the aerial vehicle relative to the zone, a vector between the aerial vehicle and the zone. The system can provide, for display via a display device communicatively coupled to the computing system, an indication of the vector overlayed on a digital representation of the image frame.

In some implementations, the system can present, via the display device, an indication of the predetermined pattern in the image frame. The system can receive, via an input device communicatively coupled to the computing system, a confirmation of the identification of the predetermined pattern. The system can generate the vector based on the receipt of the confirmation. In some implementations, the system can identify, based on the plurality of image frames, a second moving vehicle, the second moving vehicle comprising the platform. The system can determine a position of the second moving vehicle. The system can generate the vector based on the position, wherein the aerial vehicle is a vertical takeoff or landing vehicle (VTOL). In some implementations, the system can identify a landing site designation of the platform. The system can determine, based on the landing site designation, information comprising at least one of a geographic location of the landing site, an identification code for the landing site, or a weight limit of the landing site. The system can output, via the display device, the information.

In some implementations, the system can store a first representation of a dimension of the predetermined pattern at a first elevation from the platform. The system can receive a second representation of the dimension of the predetermined pattern at a second elevation from the platform. The system can determine the second elevation from the platform based on a difference between the second representation of the dimension and the first representation the dimension of the predetermined pattern. In some implementations, the system can determine a first elevation based on a weight on wheels (WOW) sensor. The system can store a first representation of a dimension of the predetermined pattern at the first elevation. The system can receive a second representation of the dimension of the predetermined pattern at a second elevation from the platform. The system can determine the second elevation from the platform based on a difference between the second representation of the dimension and the first representation the dimension of the predetermined pattern.

In some implementations, the system can navigate the aerial vehicle to the platform based on the vector. In some implementations, the vector includes a vertical distance between the platform and the aerial vehicle. The vector can include a lateral distance between the platform and the aerial vehicle, the lateral distance based on inertial measurement unit data. The vector can include a relative position between the platform and the aerial vehicle. In some implementations, the system can receive, from each of various data sources, an indication of a position of the aerial vehicle. The various data sources can include an inertial measurement unit, a global navigation satellite system, and a radio altimeter. The system can compare the position to the vector. The system can provide the indication of the vector to the display based on the comparison.

An aspect of the present disclosure can relate to a method. The method can be performed by one or more processors coupled to memory. The method can include receiving, via a camera coupled to the aerial vehicle, various image frames captured by the camera of the platform on which to land the aerial vehicle. The method can include generating, via a first model trained with machine learning on reference patterns, a feature map that identifies a predetermined pattern in an image frame of the plurality of frames that corresponds to a zone on the platform on which to land the aerial vehicle. The method can include inputting, responsive to recognition of the predetermined pattern, the feature map generated by the first model into a second model trained with machine learning on slope-intercept functions to output an orientation of the aerial vehicle relative to the zone. The method can include determining, based on an offset of the zone in the image frame and the orientation of the aerial vehicle relative to the zone, a vector between the aerial vehicle and the zone. The method can include providing for display, via a display device communicatively coupled to a computing system, an indication of the vector overlayed on a digital representation of the image frame.

In some implementations, the method can include presenting, via the display device, an indication of the predetermined pattern in the image frame. The method can include receiving, via an input device communicatively coupled to the computing system, a confirmation of the identification of the predetermined pattern. The method can include generating, the vector based on the receipt of the confirmation. In some implementations, the method can include identifying, based on the plurality of image frames, a second moving vehicle, the second moving vehicle including the platform. The method can include determining a velocity of the second moving vehicle. The method can include generating the vector based on the velocity. In some implementations, the method can include identifying a landing site designation of the platform. The method can include determining, based on the landing site designation, information including at least one of a geographic location of the landing site, an identification code for the landing site, or a weight limit of the landing site. The method can include outputting, via the display device, the information.

In some implementations, the method can include storing a first representation of a dimension of the predetermined pattern at a first elevation from the platform. The method can include receiving a second representation of the dimension of the predetermined pattern at a second elevation from the platform. The method can include determining the second elevation from the platform based on a difference between the second representation of the dimension and the first representation the dimension of the predetermined pattern. In some implementations, the method can include determining, a first elevation based on a weight on wheels (WOW) sensor. The method can include storing a first representation of a dimension of the predetermined pattern at the first elevation. The method can include receiving a second representation of the dimension of the predetermined pattern at a second elevation from the platform. The method can include determining the second elevation from the platform based on a difference between the second representation of the dimension and the first representation the dimension of the predetermined pattern. In some implementations, the method can include navigating the aerial vehicle to the platform based on the vector.

An aspect of the present disclosure can relate to an aerial vehicle. The aerial vehicle can include a computing system comprising one or more processors, coupled with memory. The aerial vehicle can receive, via a camera coupled to the aerial vehicle, a plurality of image frames captured by the camera of a platform on which to land the aerial vehicle. The aerial vehicle can generate, via a first model trained with machine learning on reference patterns, a feature map that identifies a predetermined pattern in an image frame of the plurality of frames that corresponds to a zone on the platform on which to land the aerial vehicle. The aerial vehicle can input, responsive to recognition of the predetermined pattern, the feature map generated by the first model into a second model trained with machine learning on slope-intercept functions to output an orientation of the aerial vehicle relative to the zone. The aerial vehicle can determine, based on an offset of the zone in the image frame and the orientation of the aerial vehicle relative to the zone, a vector between the aerial vehicle and the zone. The aerial vehicle can provide, for display via a display device communicatively coupled to the computing system, an indication of the vector overlayed on a digital representation of the image frame.

In some implementations, the aerial vehicle can present, via the display device, an indication of the predetermined pattern in the image frame. The aerial vehicle can receive, via an input device communicatively coupled to the computing system, a confirmation of the identification of the predetermined pattern. The aerial vehicle can generate the vector based on the receipt of the confirmation. In some implementations, the aerial vehicle can identify, based on the image frames, a second moving vehicle, the second moving vehicle including the platform. The aerial vehicle can determine a velocity of the second moving vehicle. The aerial vehicle can generate the vector based on the velocity. In some implementations, the aerial vehicle can generate, based on the vector, a control signal to cause the aerial vehicle to descend towards the platform. The aerial vehicle can generate, subsequent to the generation of the control signal, a second vector between the aerial vehicle and the platform. The aerial vehicle can compare a difference between the vector and the second vector to a threshold, the threshold corresponding to a predefined descent rate. The aerial vehicle can generate a second control signal based on the comparison of the difference.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g., disks or other non-transitory storage media) or intangible carrier media (e.g. communication signals). Aspects can also be implemented using suitable apparatus, which can take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
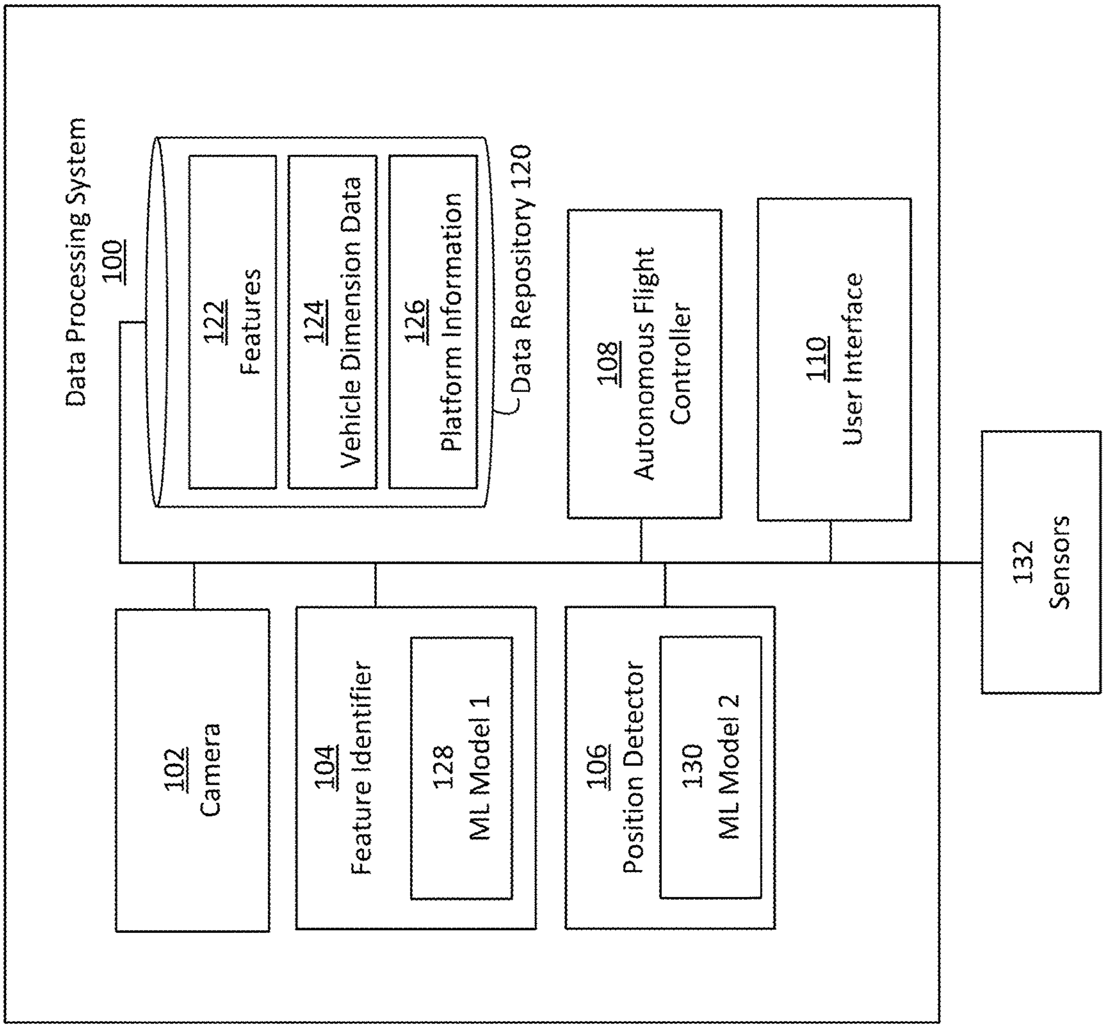
FIG. 1 illustrates a block diagram of an example data processing system, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations can be utilized, and other changes can be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems, apparatuses, and methods described herein allow for optical measurement and cuing which can be used for navigational actions. The cuing can be provided as a representation via a display device, or as an input to an autonomous system. The measurement can be provided according to image data generated from a camera, which can be fused with other sensor data (e.g., altimeter data). The cuing can provide an indication of a relative position between a platform at a landing site and the aerial vehicle. The indication can include or be based on a vector between the platform and the aerial vehicle. The vector can include a lateral and vertical component, or an indication of an attitude of the aerial vehicle or the platform. For example, the vector can aid in maneuvering the aerial vehicle relative to a static or moving platform (e.g., a landing pad disposed on the ground, on a deck of a ship, or another structure).

FIG. 1 depicts a block diagram of an example data processing system 100, in accordance with one or more implementations. The data processing system 100 can be referred to as, or include, a computing system having one or more processors coupled with memory. The data processing system 100 can include, interface with, access, or otherwise utilize data from at least one camera 102. The data processing system 100 can include at least one feature identifier 104. The data processing system 100 can include at least one position detector 106. The data processing system 100 can include at least one autonomous flight controller 108. The data processing system 100 can include at least one user interface 110. The data processing system 100 can include at least one data repository 120.

The camera 102, feature identifier 104, position detector 106, autonomous flight controller 108, or user interface 110 can each include one or more processing unit or other logic device such as programmable logic array engine, or module configured to communicate with the data repository 120 or database. The camera 102, feature identifier 104, position detector 106, autonomous flight controller 108, or user interface 110 can be separate components, a single component, or part of the data processing system 100. The data processing system 100 can include hardware elements, such as one or more processors, logic devices, or circuits. For example, the data processing system 100 can include one or more components, structures or functionality of a computing device depicted in FIG. 8.

The data repository 120 can include one or more local or distributed databases, and can include a database management system. The data repository 120 can include computer data storage or memory and can store one or more of features 122, vehicle dimensional data 124, or platform information 126. The features 122 can include edges, corners, intersections, color distributions, or other aspects of image data. The features 122 can correspond to (e.g., painted) markings over a surface of a platform, such as reflective paint configured for recognition by the camera 102. The features 122 can be constituent features 122 of a predetermined pattern. For example, an 'H' of a helipad can include features relating to distances between aspects of the pattern, thicknesses of lines, or the like. Features 122 can correspond to various predetermined patterns, such as a Sierpinski Triangle, wherein a facing of the pattern can include information relating to an approach or departure direction. In some implementations, the predetermined pattern can include or be disposed proximal to markings such as directional arrows, or text (e.g., landing site designators, approach headings). In some implementations, the predetermined pattern can include or be disposed proximal to lights, surface boundaries (e.g., a transition between a paved area and a gravel portion).

A feature 122 can be, or include, a predetermined dimension of a predetermined marking. For example, a portion of a marking on a helipad can extend for 12 feet (e.g., a leg of a symbol 'H' painted or otherwise located on a helipad). A feature 122 of the predetermined marking can be compared to a distance at a known elevation, such that a detection of a feature 122 of the predetermined marking (e.g., an angular distance or number of pixels can be indicative of a distance therefrom). Thus, the data processing system 100 can determine elevation data based on a distance in combination with angular offset data, or determine a lateral distance from a distance to the feature 122 in combination with altimeter data.

One or more features 122 can be aggregated in a feature map. The feature map can include an identity, location, number of instances or relative positions of the various features 122. In the case of a helipad 'H,' the corners of the 'H' (where the straight lines meet and change direction) can be included as first features 122 of the feature map. The data processing system 100 can highlight these corners, according to a shift in image intensity as the color of the 'H' contrasts with the surrounding helipad surface. Other features 122 of the helipad can correspond to other portions of a marking. Within the feature map, the feature 122 can be ranked based on the intensity of the corner. A grayscale format typically used in such feature maps can aid recognition of these features 122.

The vehicle dimensional data 124 can include a length, width, weight, or other information of the aerial vehicle. The vehicle dimensional data can 124 include a position of the camera 102 relative to an extreme or center of the aircraft (e.g., relative to a center of gravity, CG). The vehicle dimensional data 124 can include a vertical distance from the camera 102 to a wheel or skid, for example.

The platform information 126 can include information associated with a landing site. For example, the information can include a geographic location (e.g., coordinate or identifier corresponding to a stored geographic location). The platform information 126 can include an identification code for the landing site. The information can include a dimension of the landing site such as a weight limit, area, lateral dimension or so forth. The platform information 126 can include an indication of a zone for landing the aircraft, such as a portion of the platform configured to receive the aerial vehicle. The platform information 126 can be determined based on observance of one or more features 122 of a platform. For example, the platform information 126 can be determined based on the features 122 themselves, or platform information 126 stored in memory can be retrieved based on an identification of a landing site (e.g., according to a unique or non-unique identifier thereof).

The platform information 126 can include information related to a landing surface. For example, a platform defined in a field can include grass or a terrain surface, a platform on a surface of a ship can include a paved surface. A predetermined pattern or other marking can include a painted marking, a light source, or another indicator.

The data processing system 100 can include, interface with, access, or otherwise utilize data from at least one camera 102 designed, constructed, or operational to generate (e.g., capture) image data including image frames. The camera 102 can include various sensors configured to generate the image frames. For example, the camera 102 can include a visible spectrum camera, grayscale camera, an infrared camera 102 (e.g., near or mid-wave infrared camera). The camera 102 can be configured or selected to discriminate between a marking and a surface (e.g., a reflective paint and a paved surface). The images can include optical images, point clouds (e.g., LiDAR images), or other image types. The camera 102 can capture various image frames of an environment including a platform on which to land an aerial vehicle.

The camera 102 can capture or process an image in various resolutions. For example, the camera can include a high resolution camera (e.g., 1080×1920, 2560×1440, 3480×2160). The camera 102 can resolve images at a rate to capture information in the frame to detect features 122 of a platform under a motion of the aerial vehicle and the platform. For example, the camera 102 can resolve images at 30 frames per second, 60 frames per second, or 120 frames per second. Various operations of the models described herein can be performed at a native resolution of the camera 102, or can be scaled or otherwise processed to another resolution (e.g., according to available compare or latency associated with a display of the aerial vehicle). For example, models described herein can operate with input layers of 328×480 or 640×480. Output layer may be further scaled.

The camera 102 can be integral to or otherwise coupled with the aerial vehicle. For example, the camera 102 can be connected to an underside of the aerial vehicle, and oriented in a downward facing configuration. The camera 102 can capture images which are not otherwise observable by a pilot of the aerial vehicle (e.g., a human operator or an autonomous flight controller 108). For example, the camera 102 can be disposed to capture image data of an environment directly beneath a helicopter, which is otherwise unobservable by a pilot (e.g., for an aerial vehicle with an opaque underside). The camera 102 can capture images at a higher data rate or lower latency that other sensors of the aerial vehicle. The camera 102 can be disposed along a longitudinal or other center of gravity (CG) of the aircraft, such as at a datum point corresponding to a nominal center, whereas the actual center may vary according to conditions, loading, attitude, and so forth. The camera 102 can be disposed a predefined distance from a datum point or longitudinal center of gravity (CG). An offset therebetween can be stored in the data repository 120, as vehicle dimensional data 124.

The camera 102 can be selectively coupled to the aerial vehicle, such that the camera 102 or other portions of the data processing system 100 can be relocated between aerial vehicles 502 according to a mission requirement. The camera 102 can be communicatively coupled to other portions of the data processing system 100 via a wired or wireless link, such as a wireless link between the camera 102 and another portion of the aerial vehicle, the camera 102 and another aerial vehicle, or the camera 102 and a ground-based control system. The wireless link can include, for example, Wi-Fi, 5G.MIL®, or other wireless standards. The data processing system 100 can include or interface with various further sensors 132. For example, the data processing system 100 can include additional cameras 102, or other sensors 132 such as the sensors depicted in the sensor suite 601 of FIG. 6.

The data processing system 100 can include at least one feature identifier 104 designed, constructed, or operational to identify features 122 associated with a platform. For example, the feature identifier 104 can identify a landing marking (e.g., a helipad 'H'), aiming marking such as a circle or triangle circumscribing the landing marking or directional arrows, perimeter markings, an indication of a safety area, lighting markings, or a unique identifier or other marking configured to convey information associated with a platform.

The feature identifier 104 can include or use a first machine learning (ML) model 128 trained with machine learning on reference patterns. For example, the ML model 128 can generate a feature map. The feature map can identify a predetermined pattern (e.g., 'H') in an image frame received from the camera 102. The predetermined pattern can correspond to a zone on a platform on which to land an aerial vehicle. The first ML model 128 can include a convolutional neural network, or a feature-based network such as Scale-Invariant Feature Transform (SUFT), Speeded-Up Robust Features (SURF), Oriented FAST and Rotated BRIEF (ORB), or Histogram of Oriented Gradients (HOG). The feature identifier 104 can determine a match between a reference pattern and a predetermined patterns of the image frame data. The training data for the first ML model 128 can include various instances of the predefined pattern. The feature identifier 104 can determine a confidence associated with the match, compare the confidence to a threshold, and determine, based on the comparison that the predetermined pattern 202 corresponds to the reference pattern.

The feature identifier 104 can identify various information related to a platform, such as a lateral dimension, approach direction, or other data. Some information can be determined from a marking. For example, an identifier can include a landing site designation, such as a landing pad number, a directional indicator, location identifier, or so forth. The landing site designation can be unique or non-unique to a landing site. The feature identifier 104 can determine platform information 126 based on the landing site designation. For example, the feature identifier 104 can determine information embedded in ta marking, or by retrieving platform information 126 from the data repository 120 based on the landing site designation (e.g., a unique or non-unique identifier thereof). The feature identifier 104 can identify a landing site or portion thereof according to a surface boundary (e.g., between a paved portion and a non-paved portion).

The data processing system 100 can include at least one relative positioner 106 designed, constructed, or operational to detect a relative position between an aerial vehicle and a platform or other point-of-interest associated with a predetermined pattern. The relative positioner 106 can include or interface with various sensors to determine aircraft orientation or attitude relative to one or more reference points. The relative positioner 106 can employ multiple sensors to validate, confirm, or predict an orientation. The relative positioner 106 can include a global navigation satellite system (GNSS) can determine a position or speed with respect to a navigational satellite. A radio or barometric altimeter can determine an elevation relative to an atmosphere or a radio-reflective surface. An inertial management unit (IMU) can determine a position of an aircraft relative to a previous position, or an applied force (e.g., gravity or a magnetic field).

The relative positioner 106 can ingest a feature map generated by the feature identifier 104 into a second ML model 130 trained with machine learning on slope-intercept functions. The position detector 106 can determine an orientation of the aerial vehicle, relative to the zone on the platform to land the aerial vehicle. The second ML model 130 can output the orientation of the aerial vehicle relative to the zone. The orientation (e.g., attitude) can include an attitude of the aircraft, such as an elevation, pitch, roll, yaw, speed, or so forth. The position detector 106 can determine a vector between the aerial vehicle and the zone.

The vector between the aerial vehicle and the zone can include a relative position between the platform and the aerial vehicle (e.g., a straight-line distance, a lateral distance, or a relative attitude such as yaw). For example, the vector can include a vertical distance between the platform and the aerial vehicle. The vector can be based on the first ML model 128 of the feature identifier 104 or other sensor data. In some implementations, a combination of sensor data can be employed. For example, the vector can include a lateral distance between the platform and the aerial vehicle. Such as distance can be determined by the feature identifier 104 based on inertial measurement unit data.

The position detector 106 can determine the vector based on an offset of the zone in the image frame and the orientation of the aerial vehicle. For example, the slope-intercept functions used to train the second ML model 130 can include target labels of relative positions or orientation of the aerial vehicle. The target labels can be determined according to an angular offset between various features 122 of predetermined patterns 202, based on altimeter or other data. For example, by determining an angular offset between one or more positions of a predetermined pattern, in combination with a known relative elevation, the position detector 106, or a training input thereof, can determine a lateral offset therefrom according to the altitude*tan(angle). By determining such an offset for multiple locations or features 122 of a predetermined pattern, the position detector 106 can determine a position of the aerial vehicle. For example, the position detector 106 or another portion of the data processing system 100 can determine a relative position between a first point of the predetermined pattern, and another point a predefined distanced away (e.g., 12 feet). The information can be input to the second ML model 130 of the position detector 106, whereupon the position detector 106 can generate positions based on received feature maps. In some implementations, the training data can correspond to altimeter data relevant to a level surface under the aircraft and at the landing site, or lagging GPS data, wherein the trained second ML model 130 can determine a relative position wherein an elevation of the platform various from the elevation of the aircraft (e.g., a helicopter 30 meters over water, approaching a platform on a deck ship 10 meters over the water).

The data processing system 100 can determine the orientation of the vehicle in reference to the zone on the platform or relative to other points of reference. For example, a platform disposed on a roof of a building may have a different elevation relative to a ground level. A platform disposed on a vehicle, such as a landing pad dock ship, can include time-variant relative yaw, roll, pitch, elevation, or other attitude (e.g., according to ship motion, such as heave, sway, roll, or pitch). The position detector 106 can identify a second moving vehicle (e.g., a ship including a platform) that is different than the aerial vehicle. For example, the position detector 106 can employ the second ML model 130 to identify the ship (e.g., according to a flow model, image classification, or another model), can identify the second moving vehicle based on a user input, or input from another source. The position detector 106 can determine a position of the second moving vehicle. The position of the second moving vehicle can include heave, sway, surge, roll, pitch, or yaw, for example. The position detector 106 generate the vector based on the position of both vehicles. For example, in the case of a vertical takeoff or landing vehicle (VTOL), the position detector 106 can generate a vector between the VTOL vehicle and a helipad of the ship.

The position detector 106 can determine a relative position based on multiple frames of image data. For example, the position detector 106 can store a representation of a dimension of the predetermined pattern at a first elevation from the platform. The elevation can be a zero or non-zero elevation. For example, the elevation can be received from an altimeter, manual entry, or determined based on a rotor speed, weight on wheels (WoW) sensor, or other indication that the aerial vehicle is on the ground. Thereafter, the position detector 106 can receive another representation of the dimension of the predetermined pattern at another altitude). The position detector 106 can determine the altitude based on a difference between the first representation and the second representation. For example, the position detector 106 can compare a size of the predetermined pattern, or a size adjusted for a lateral offset to determine an elevation (e.g., determine an elevation of 100 feet based on a dimension of 12 feet occupying 13° by applying an arctangent).

The position detector 106 can determine a position (e.g., an attitude, height, or lateral position) based on various sensors in combination with the camera 102. For example, the position detector 106 can determine an offset from a previous position based on an inertial measurement unit, a speed based on a global navigation satellite system (GNSS) such as global positioning system (GPS) or GLONASS. The position detector 106 can determine a height based on a radio or other altimeter, wherein the height may be relative to a platform, or another location (e.g., a sea level in proximity to a ship). In some implementations, the position detector 106 can compare a determined position to the vector (e.g., an offset or bound thereof, and provide an indication of the vector based on the comparison. For example, the position detector 106 can generate fine detail information according to the camera 102, confirm that the information does not conflict with course information generated from other sensors (e.g., to validate the position), and provide the vector based on the comparison. The provision of information can be via a display device, or to an autonomous flight controller 108.

The data processing system 100 can include at least one autonomous flight controller 108 designed, constructed, or operational to execute a navigational action to adjust a position of the aerial vehicle. The autonomous flight controller 108 can include a trajectory follower having aircraft flight controls (e.g., throttle, anti-torque controls or a cyclic control). For example, the trajectory follower of the autonomous flight controller 108 can directly control the flight of the aerial vehicle (e.g., in an autonomous aerial vehicle) to navigate a route determined or received by the data processing system 100, according to a path determined by a local motion planner. The trajectory follower of the autonomous flight controller 108 can maneuver the aerial vehicle to land at a zone of a platform identified by the data processing system 100. Like other components of the present disclosure, some vehicles can omit an autonomous flight controller 108, wherein navigational actions referred to with regard to the autonomous flight controller 108 can be presented via a display device to a pilot. For example, the data processing system 100 can be configured to, in a first mode of operation, execute navigational actions via a presentation of information to a pilot and, in a second mode of operation, execute navigational actions via presentation of data to the autonomous flight controller 108 (e.g., a vector indicating a relative position between an aerial vehicle and a platform including a landing zone).

The data processing system 100 can include at least one user interface 110 designed, constructed, or operational to present positional information of the aerial vehicle. For example, the user interface 110 can include a display within a cabin of the aerial vehicle. The user interface 110 can include a graphical user interface (GUI). For example, a GUI can present information to a pilot through a graphical, visual, or audio indicators (e.g., audible alarms, LEDs, or haptic feedback). The GUI can present information such as a position of an aerial vehicle, position of a platform, or navigational action to land the aerial vehicle. The user interface 110 can include one or more inputs such as buttons (e.g., a keypad), touchscreens, levers, pedals, and the like. For example, the user interface 110 can receive flight controls or other information via the user interface 110. The information can include confirmatory information, such as a confirmation upon a user selection of any information presented to a user.

The user interface 110 can receive an indication of a vector overlayed on a digital representation of an image frame. The indication can be provided to the user interface 110 for display via a display device (e.g., the GUI). The digital representation can include other information, such as a representation of the predetermined image. The user interface 110 can present an indication of the predetermined pattern from the image frame (e.g., an overlay depicting a predetermined pattern such as a standard helipad 'H,' or an image of the particular predetermined pattern). The user interface 110 can receive a confirmation of the identification of the predetermined pattern via an input device such as a touch screen, button, or other input. The data processing system 100 can generate the vector or take a navigational action based on the receipt of the confirmation.

Figure 2:
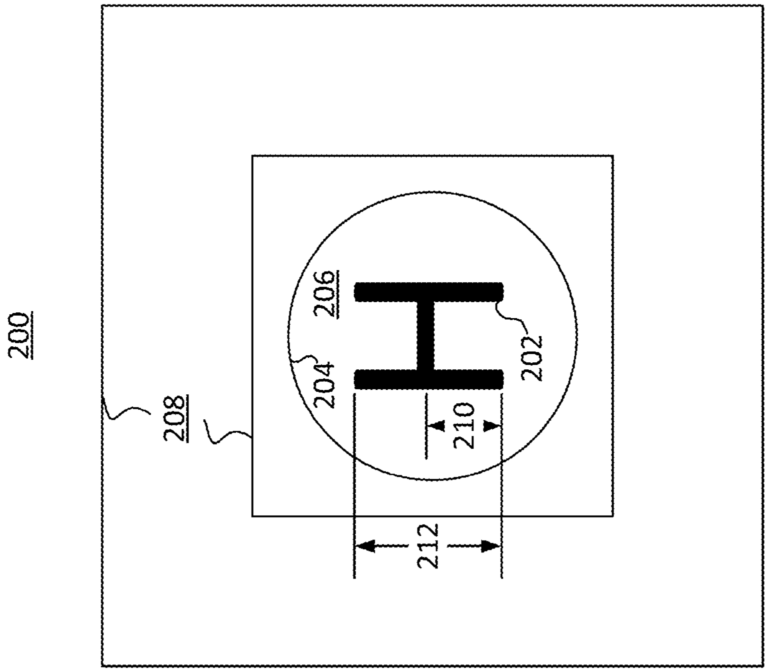
FIG. 2 illustrates an example representation of a platform, in accordance with one or more implementations.

FIG. 2 illustrates an example representation of a platform 200. The platform 200 includes a predetermined pattern 202 including various features 122. The position of the predetermined pattern 202 may be indicative of an intended approach direction. The predetermined pattern 202 is disposed relative to a further marking 204 (e.g., circumscribed by a circle). The further marking 204 can include a triangle, landing pad number, directional indicator, or other information. The predetermined pattern 202 and the further marking 204 are disposed in a zone 206 for landing an aerial vehicle. Some platforms 200 can include further markings 204 outside of the zone 206 (e.g., approach directional indicators, lights, or so forth). The platform 200 can further include or be associated with a further boundary or perimeter lines 208 which may define or identify a portion of a landing site cleared of foreign objects and debris, or indicate an area which should be maintained clear for the aerial vehicle. For example, the perimeter lines 208 can define or identify clearance areas, approach areas, or so forth.

The depicted platform 200 is presented according to top-down view (e.g., isometric view). A representation of the platform 200 in image data received by the camera 102 can vary from the depicted view. For example, the depicted view can describe a view from directly over a center of the platform 200, or a transformation of another view. For example, the platform 200 can be disposed on a moving object such as a ship, or another object which can differ from an indicated terrain elevation, such as a rooftop platform 200. In some implementations, a transformed view can be configured to represent an equal number of pixels according to an angular offset. For example, wherein the aircraft is disposed over the bottom of the left leg of the predetermined pattern 202, a first distance 210 to the center of the leg can be depicted by twice the angular offset as a second distance 212 between the bottom of the leg and the top of the leg. A same number of pixels can be disposed between the center of the leg and each of the bottom and the top of the leg.

Figure 3:
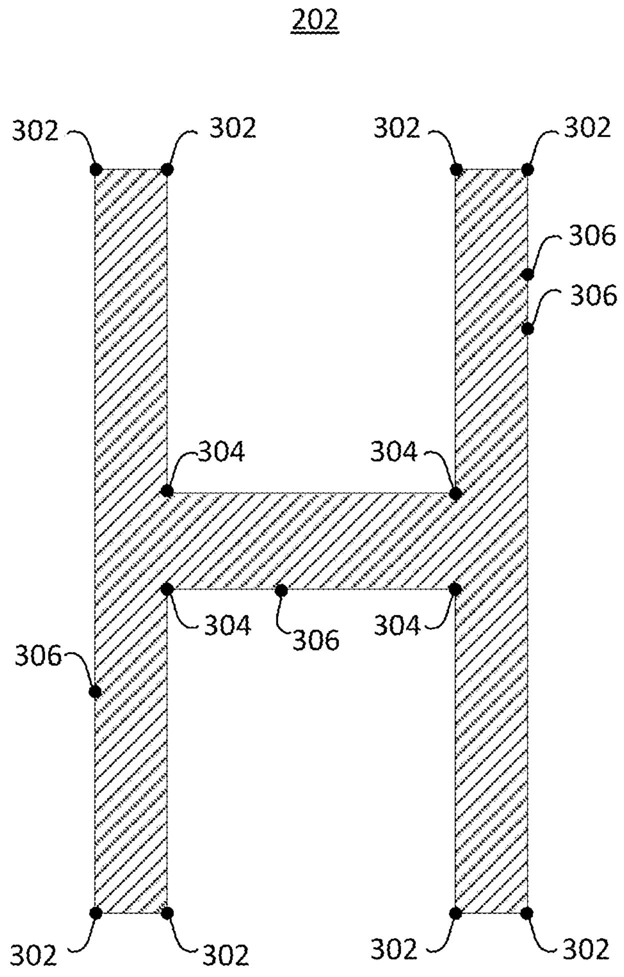
FIG. 3 illustrates an example representation of a predetermined pattern, in accordance with one or more implementations.

FIG. 3 illustrates an example representation of various features 122 of a predetermined pattern 202. Features 122 can vary according to a predetermined pattern 202. For example, in some instances, a predetermined pattern 202 can include color features 122, intersections, distances, or so forth. Although presented as an 'H' corresponding to a helipad landing zone 206, other predetermined patterns 202 are contemplated, such as a Sierpinski Triangle, or features 122 can be substituted for a user selection (e.g., a search area for a swimmer in distress or other location of interest).

Non-static points of interest (e.g., a swimmer drifting in a current or a helipad disposed on a moving ship) can further complicate navigational actions performed with regard to a relative position between the aerial vehicle and the point-of-interest. For example, wherein the platform is a helipad of a moving ship (e.g., listing, turning, or under propulsion), the position of the platform can be time-variant. According to some implementations, the features 122 can correspond to another object (e.g., the swimmer in distress) such that a point of interest can be identified based on a feature set of the feature map.

The various features 122 can vary according to a particular model employed. For example, according to a Shi-Tomasi corner detection model of the first ML model 128, the data processing system 100 can detect various corners or edges. A first feature 302 depicts an outer corner of a boundary between the predetermined pattern 202 (e.g., white or yellow reflective paint thereof), and another surface (e.g., a helipad structure formed over a building, flight deck, ground terrain, or so forth). Particularly, a helipad 'H' can include instances of the first feature 302 at corners of the 'legs' of the 'H.' The first feature 302 can generally include an intersection point surrounded by 90° of the predetermined pattern 202 and 270° of a background pattern object.

A second feature 304 depicts an inner corner of a boundary between the predetermined pattern 202, and another surface. Particularly, a helipad 'H' can include instances of the second feature 304 at the intersections of the 'legs' with the crossbar of the 'H.' The second feature 304 can generally include an intersection point surrounded by 270° of the predetermined pattern 202 and 90° of a background pattern object. A third feature 306 depicts other edges of the predetermined pattern 202. Although some example instances of the third feature 306 are shown, the data processing system 100 can detect various instances over time, wherein the predetermined pattern 202 can be detected according to a memory-based model (e.g., a recursive neural network).

Figure 4:
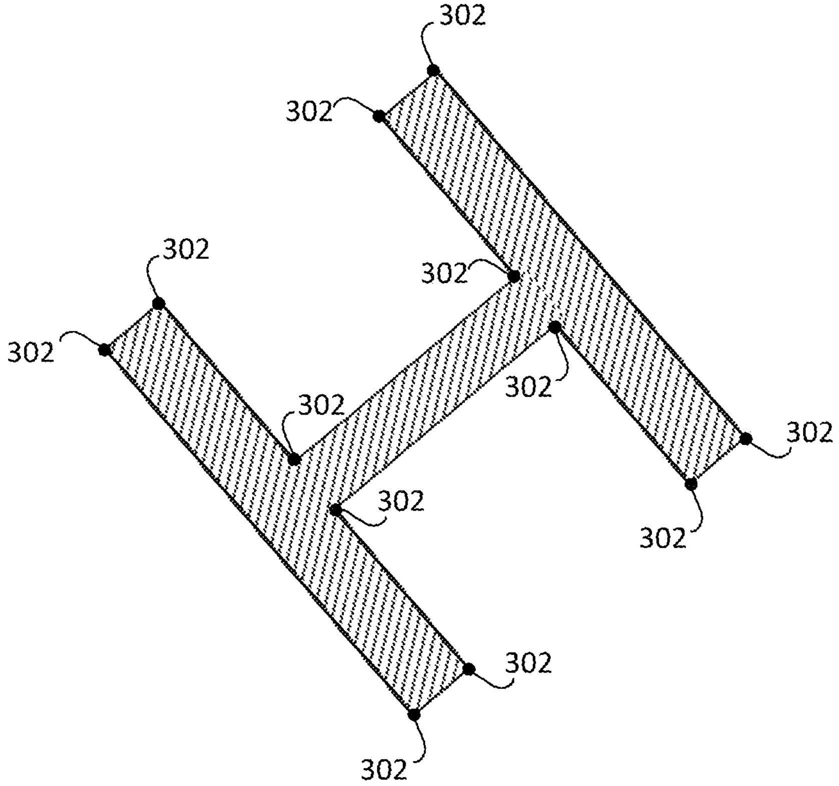
FIG. 4 illustrates an example representation of a predetermined pattern, in accordance with one or more implementations.

According to a position of the aerial vehicle and the platform 200, the predetermined pattern 202 can appear differently in image data captured by the camera 102. For example, the depiction of FIG. 3 depicts a predetermined pattern 202 viewed from directly above. FIG. 4 is another depiction of the predetermined pattern 202 appears askew. Further, the predetermined pattern 202 can appear larger or smaller in the image data according to a distance (e.g., elevation or lateral distance). A relative position of the aerial vehicle and the platform (e.g., a static platform 200 or a platform 200 disposed on a vehicle) can be indicative of a relative position between the two. For example, the data processing system 100 can identify features 122 of the predetermined pattern 202, such as the first features 302 and the second features 304, as depicted. The data processing system 100 can determine a relative position based on the identified features. For example, the data processing system 100 can ingest the predetermined pattern 202 into the feature identifier 104 to generate a feature map including the depicted features 122, and ingest the generated feature map into the second ML model 130 of the position detector 106 to determine a position between the aerial vehicle and the predetermined pattern 202.

Figure 5:
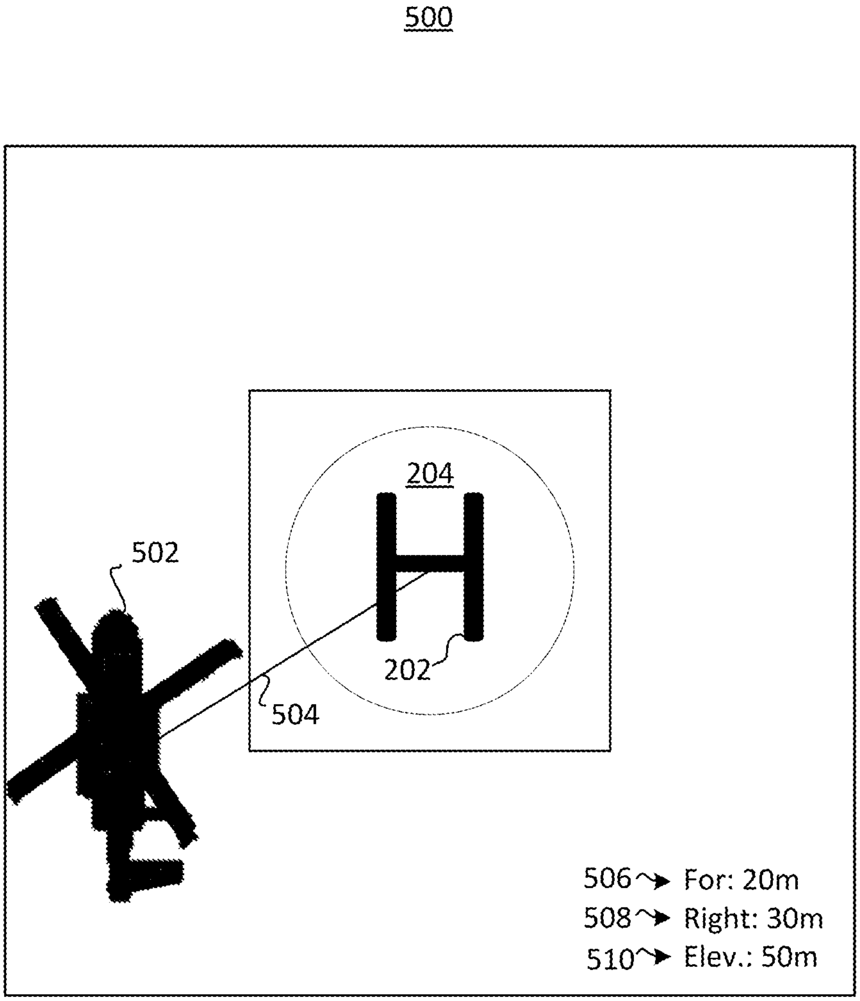
FIG. 5 illustrates a graphical user interface, in accordance with one or more implementations.

FIG. 5 depicts a graphical user interface 500 (GUI) is illustrated in accordance with one or more implementations. The GUI 500 can provide a depiction of a position of the aerial vehicle 502. The GUI 500 can be positioned within the aerial vehicle 502 such that it can be accessed by the operator during operation of the aerial vehicle 502, or can be remote from the aerial vehicle 502, such that it can be accessed by a remote operator. The GUI 500 can include devices that present specific sensor information, such as speed, direction, velocity, or position.

The GUI 500 can provide a depiction of a zone 206 for landing an aerial vehicle 502, the zone 206 provided with respect to a predetermined pattern 202. The depiction of the zone 206 (e.g., including the predetermined pattern 202) can include image data or another representation of the zone 206. For example, the GUI 500 can include a reference image of one or more portions of the zone 206 corresponding to a position thereof detected based on image data from a camera 102.

The GUI 500 can display a position of the aerial vehicle 502 in relation to the zone 206. The position can be provided according to a vector 504 between the aerial vehicle 502 and the zone 206. The vector 504 can be provided as a graphical vector 504, or according to various components thereof. For example, a first lateral offset 506 (for/aft position), second lateral offset 508 (left/right position), and vertical offset 510 (e.g., relative elevation) can be provided according to a textual or graphical indication. In some implementations, an indication of a relative attitude can be depicted on the GUI 500, such as by a position of the depicted aerial vehicle 502, or a separate attitude indicator (e.g., artificial horizon) which can be provided relative to a platform 200 of the zone 206.

The GUI 500 can update responsive to receipt of image frames from the camera 102. For example, the GUI 500 can provide an updated position of the aerial vehicle 502 during navigational acts thereof, such that an operator can adjust a control input for the aerial vehicle 502 responsive to a receipt of an updated position. Implementations of the present disclosure employing an autonomous flight controller 108 can likewise adjust a control input responsive to an updated position. For example, the adjustment can be provided to accord with a rate of descent or cyclic control limit.

Figure 6:
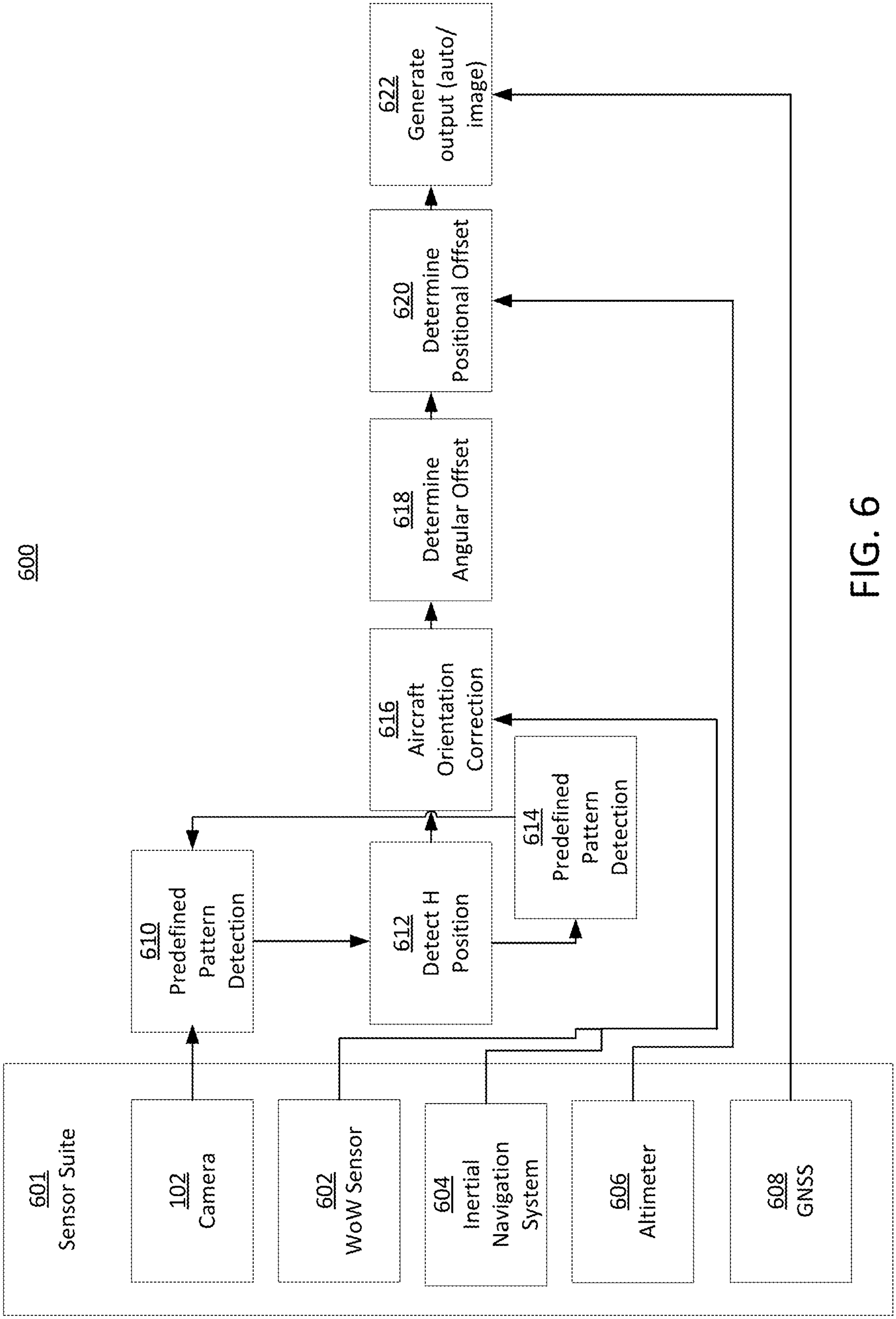
FIG. 6 illustrates an operational system flow diagram of navigating an aerial vehicle using optical measurements, in accordance with one or more implementations.

FIG. 6 depicts an operational system flow diagram of navigating an aerial vehicle 502 using optical measurements, in accordance with one or more implementations. The hybrid flow diagram depicts ACTs associated with the method 600 with reference to a suite 601 of sensor inputs associated with the ACTs. The method 600 can be executed, performed, or otherwise carried out by a data processing system 100, which can include one or more processors or other elements of the computer system 800 described herein in conjunction with FIG. 8, or any other computing devices.

At ACT 610 the method 600 can include detecting, by the data processing system 100, a predetermined pattern 202. The predetermined pattern 202 can be detected in image data received from a camera 102 coupled with the aerial vehicle 502. For example, the image data can include various frames, wherein the predetermined pattern 202 can be detected in one or more of the frames. The predetermined pattern 202 can be detected by the feature identifier 104, such as according to one or more first ML models 128 (e.g., a feature-based model, pattern detection or classification model, or the like).

At ACT 612 the method 600 can include identifying, by the data processing system 100, a location of the predetermined pattern 202 within the image data. For example, identifying the location can include defining a center point of one or more features 122 of the predetermined pattern 202. The features 122 can be indicative of a size or orientation of the predetermined pattern 202. For example, the identification of a distance of a leg or crossbar of an 'H' pattern can be identified within the image frame. The identification of the location can include an identification of a number of pixels along a distance within the image frame or another dimension of the image. The data processing system 100 can identify the location based on, as constrained by, or adjusted from, a position of the predetermined pattern 202 in a prior frame. For example, at ACT 614, a position of the predetermined pattern 202 within a previous frame can be compared to a position of the predetermined pattern 202 in a most recent frame, such as by thresholding a change in position of the predetermined pattern 202, or applying recursive neural network, flow model, or other memory-based model to determine the position (e.g., the second ML model 130). In some instances, sensor data (e.g., inertial navigation system 604 sensor data can be employed to constrain relative change in location based on a change in position or attitude of the aerial vehicle 502). For example, a large displacement of a position of the predetermined pattern 202 can correspond to an abrupt yawing of the aerial vehicle 502, whereas a large displacement of a position of the predetermined pattern 202 relative to a stable aerial vehicle 502 may be filtered.

At ACT 616, the method 600 can include a transformation, by the data processing system 100, of the aircraft orientation. For example, the transformation can provide an orthographic projection for a view of a surface including a landing zone 206. In some implementations, the transformation can generate a view centered on the predetermined pattern 202 or another location disposed below the aerial vehicle 502. The transformation can generate a display such as a video display according to a "virtual camera." The data processing system 100 can generate a "virtual camera" centered on the aerial vehicle or the platform, the "virtual camera" varying from a position or attitude of an aerial vehicle, and including a representation of the environment around the predetermined pattern 202 or the predetermined pattern 202. The view can include a linear relationship between pixels and distance, such that relative positions can be determined based on the relative distances within the transformed image data. The distances can be based on an elevation, attitude, or other position of another sensor, such as an inertial navigation system 604 of the aerial vehicle 502. A reference elevation (e.g., of an aerial vehicle 502 on the ground) can be determined according to a weight-on-wheels (WoW) sensor 602. The position detector 106 can adjust the center of the field of view of the image data based on such attitude information. In some implementations, the position detector 106 can generate a view wherein lateral dimension of the platform 200 corresponds linearly to angular offsets (e.g., a 1° angular offset corresponds to twenty pixels in an image; a 2° angular offset corresponds to forty pixels in an image).

At ACT 618, the method 600 can include determining, by the data processing system 100, an angular offset of the aerial vehicle 502 based on the image data. The angular offset can be determined based on a number of pixels between various features 122. Based on the angular offset, the position detector 106 can determine a position, at ACT 620, by the data processing system 100. For example, a vertical leg of a right triangle can correspond to the aerial vehicle elevation (e.g., based on the INS 604, radio altimeter 606, barometer, GNSS 608, or a relative size of the predetermined pattern 202 in the image data). A lateral leg of the triangle can correspond to the lateral offset, wherein the hypotenuse corresponds to the vector 504, which can include the lateral and vertical distance, along with an attitude of the aerial vehicle 502 or the platform 200.

At ACT 622, the method 600 can include generating, by the data processing system 100, an output for a navigational action. For example, the output can be a presentation via a user interface 110, or a presentment of information (e.g., the vector 504) to the autonomous flight controller 108. The action can be or include navigation based on the vector 504 (e.g., by a pilot located in or remote from the aerial vehicle 502). For example, the user interface 110 can display the vector 504 on the GUI 500 or provide the zone 206 in relation to the aerial vehicle 502.

The depicted method 600 is not intended to be limiting. According to various implementations, ACTs can be omitted, substituted, replaced, or added. For example, a machine learning model can ingest pixel offsets, angular offsets, or elevations as training data, along with relative positions determined based thereupon, or based on other training data (e.g., other sensor inputs). The model can thereafter be employed to predict a relative position between the platform 200 and the aerial vehicle 502. For example, angular offsets and features 122 of a predetermined pattern 202 can be identified such that a position or attitude (e.g., a six degree of freedom position, sometimes referred to as a pose) can be determined and ingested into various machine learning models which can thereafter be employed to predict a subsequent position. Further, such features 122 can be detected to bound, confirm, or otherwise gate a display of data to the GUI 500, or a presentation of information (e.g., fa vector 504) to an autonomous flight controller 108, or as an alternative data source (e.g., GNSS data can be presented when a predetermined pattern 202 is not identified in image data captured by a camera 102, as in the case of environmental interference or an unavailable camera 102).

Figure 7:
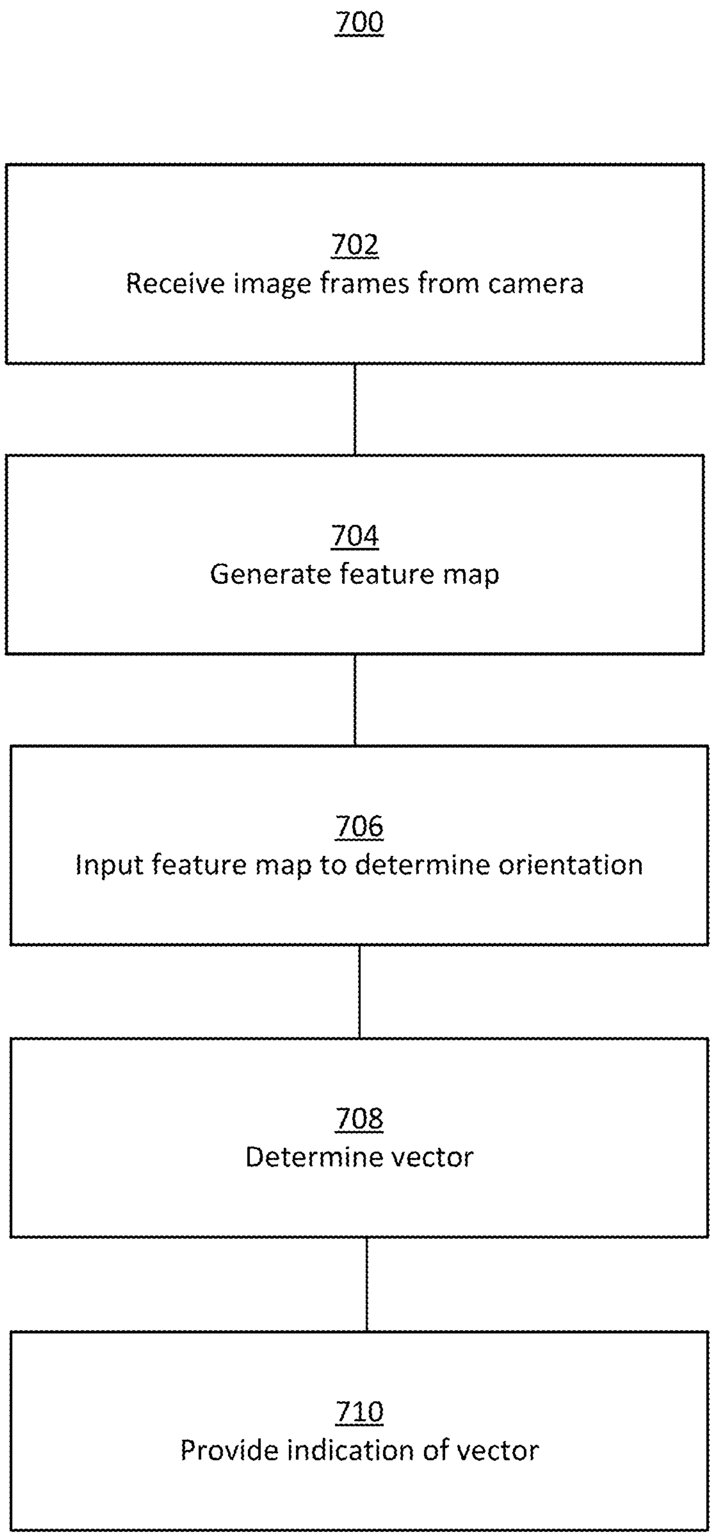
FIG. 7 illustrates a flow diagram for a method for landing an aerial vehicle on a platform, in accordance with one or more implementations.

FIG. 7 depicts an illustrative flow diagram of a method 700 of landing an aerial vehicle 502 on a platform 200, in accordance with one or more implementations. The flow diagram depicts ACTs associated with the method 700. The method 700 can be executed, performed, or otherwise carried out by a data processing system 100, which can include one or more processors or other elements of the computer system 800 described herein in conjunction with FIG. 8, or any other computing devices.

At ACT 702 the method 700 can include a receipt of image frames captured by a camera 102. At least a portion of the image frames can include a platform 200 on which to land the aerial vehicle 502. For example, the camera 102 can include a downward facing camera 102 to image a platform 200 including a zone 206 to land the aerial vehicle 502. The camera 102 can be communicatively coupled to other portions of the data processing system 100, such as to a display within a cabin of the aerial vehicle 502 configured to present information via a user interface 110, such as a graphical user interface 500.

At ACT 704 the method 700 can include a generation, by the data processing system 100, of a feature map. The data processing system 100 can identify a predetermined pattern 202 in an image frame according to the feature map. The predetermined pattern can correspond to a zone 206 to land the aerial vehicle 502. Thus, according to the identification of the predetermined pattern 202, the data processing system 100 can identify the zone 206 such that, upon determining a relative position (e.g., vector 504) between the predetermined pattern 202 and the aerial vehicle 502, the data processing system 100 can provide information, which may not be otherwise available (e.g., according to an occluded line of sight, sensor data latency, or so forth). The data processing system 100 can generate the feature map by inputting the image data (e.g., the various frames thereof) into a model trained with machine learning on reference patterns. For example, the reference patterns can include instances of the predetermined pattern 202 or variants thereof.

At ACT 706, the method 700 can include an input, by the data processing system 100, of the feature map into another model trained with machine learning. The model can be trained on slope intercept functions, as in the case of determining angular positions of features 122 to determine an aerial vehicle 502 location (e.g., based on further sensor data such as altimeter 606 data). The input can be responsive to a recognition (e.g., identification) of the predetermined pattern 202. The model can output an orientation (e.g., position or pose) of the aerial vehicle 502. The orientation can be provided relative to the zone 206 (e.g., a center thereof).

At ACT 708, the method 700 can include a determination, by the data processing system 100, of a vector 504 between the aerial vehicle 502 and the zone 206. The vector 504 can include one or more lateral components (e.g., for, aft, left, right, a radial dimension of a polar coordinate system, or so forth). The vector 504 can include an elevation component, such as a relative elevation between the zone 206 and the aerial vehicle 502. The vector 504 can include an attitude component such as a relative speed, pitch, or yaw between the zone 206 and the aerial vehicle 502. The data processing system 100 can determine the vector 504 based on an offset such as a lateral or angular offset between the aerial vehicle 502 and one or more features 122 of or proximal to the zone 206. The data processing system 100, at ACT 710, can provide an indication of the vector 504 to a display device for display. For example, the presentation can provide an indication of the vector 504 (e.g., a graphical vector or display of at least one constituent portion thereof), overlayed on a digital representation of an image frame. The digital representation can include image data (e.g., a video feed, or an icon depicting a predetermined pattern 202).

Figure 8:
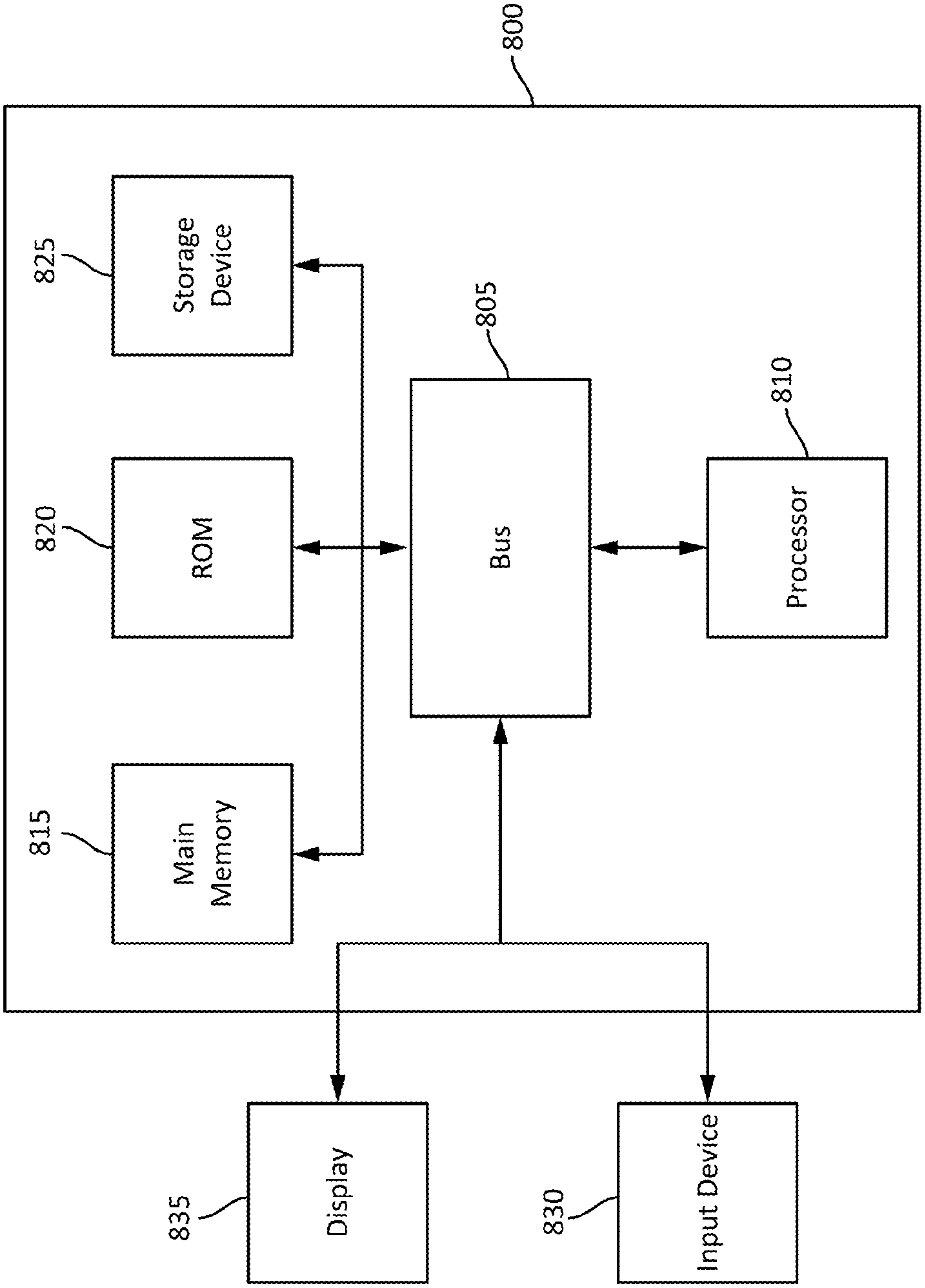
FIG. 8 illustrates a block diagram of an example computer system useful in implementing one or more components detailed herein.

FIG. 8 depicts a block diagram of an example computer system 800. The computer system or computing device 800 can include or be used to implement the data processing system 100, or its components. The computing system 800 includes at least one bus 805 or other communication component for communicating information and at least one processor 810 or processing circuit coupled to the bus 805 for processing information. The computing system 800 can also include one or more processors 810 or processing circuits coupled to the bus 805 for processing information. The computing system 800 also includes at least one main memory 815, such as a random-access memory (RAM) or other dynamic storage device, coupled to the bus 805 for storing information, and instructions to be executed by the processor 810. The computing system 800 can further include at least one read only memory (ROM) 820 or other static storage device coupled to the bus 805 for storing static information and instructions for the processor 810. A storage device 825, such as a solid-state device, magnetic disk, or optical disk, can be coupled to the bus 805 to persistently store information and instructions.

The computing system 800 can be coupled via the bus 805 to a display 835, such as a liquid crystal display, or active-matrix display, for displaying information to a user such as an administrator of the data processing system 100 (e.g., a pilot). An input device 830, such as a keyboard or voice interface can be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the display devices 835, or other components of FIG. 8.

The processes, systems, and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 can cause the computing system 800 to perform the illustrative processes described herein. One or more processors in a multi-processing arrangement can also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system to land an aerial vehicle on a platform, comprising:

a computing system comprising one or more processors, coupled with memory, to:
- receive, via a camera coupled to the aerial vehicle, a plurality of image frames captured by the camera of the platform on which to land the aerial vehicle;
- generate, via a first model trained with machine learning on reference patterns of images, a feature map that identifies a predetermined pattern in an image frame of the plurality of image frames that corresponds to a zone on the platform on which to land the aerial vehicle;
- input, responsive to recognition of the predetermined pattern from the image frame, the feature map generated by the first model into a second model trained with machine learning on slope-intercept functions according to an angular offset between features of the predetermined pattern, to output an orientation of the aerial vehicle relative to the zone;
- determine, based on an offset of the zone in the image frame and the orientation output by the second model fed from the first model of the aerial vehicle relative to the zone, a vector between the aerial vehicle and the zone; and
- provide, for display via a display device communicatively coupled to the computing system, an indication of the vector overlayed on a digital representation of the image frame.

2. The system of claim 1, comprising the one or more processors to:
- present, via the display device, an indication of the predetermined pattern in the image frame;
- receive, via an input device communicatively coupled to the computing system, a confirmation of the identification of the predetermined pattern; and
- generate the vector based on the receipt of the confirmation.

3. The system of claim 1, comprising the one or more processors to:
- identify, based on the plurality of image frames, a second moving vehicle, the second moving vehicle comprising the platform;
- determine a position of the second moving vehicle; and
- generate the vector based on the position, wherein the aerial vehicle is a vertical takeoff or landing vehicle (VTOL).

4. The system of claim 1, comprising the one or more processors to:
- identify a landing site designation of the platform;
- determine, based on the landing site designation, information comprising at least one of a geographic location of a landing site, an identification code for the landing site, or a weight limit of the landing site; and output, via the display device, the information.

5. The system of claim 1, comprising the one or more processors to:

store a first representation of a dimension of the predetermined pattern at a first elevation from the platform;

receive a second representation of the dimension of the predetermined pattern at a second elevation from the platform; and determine the second elevation from the platform based on a difference between the second representation of the dimension and the first representation the dimension of the predetermined pattern.

6. The system of claim 1, comprising the one or more processors to:

determine a first elevation based on a weight on wheels (WOW) sensor;

store a first representation of a dimension of the predetermined pattern at the first elevation;

receive a second representation of the dimension of the predetermined pattern at a second elevation from the platform; and determine the second elevation from the platform based on a difference between the second representation of the dimension and the first representation the dimension of the predetermined pattern.

7. The system of claim 1, comprising the one or more processors to:

navigate the aerial vehicle to the platform based on the vector.

8. The system of claim 1, wherein the vector comprises:

a vertical distance between the platform and the aerial vehicle;

a lateral distance between the platform and the aerial vehicle, the lateral distance based on inertial measurement unit data; and a relative position between the platform and the aerial vehicle.

9. The system of claim 1, comprising the one or more processors to:

receive, from each of a plurality of data sources, an indication of a position of the aerial vehicle, the plurality of data sources comprising:

an inertial measurement unit;

a global navigation satellite system; and a radio altimeter;

compare the position to the vector; and provide the indication of the vector to the display based on the comparison.

10. A method for landing an aerial vehicle on a platform, the method comprising:

receiving, by one or more processors via a camera coupled to the aerial vehicle, a plurality of image frames captured by the camera of the platform on which to land the aerial vehicle;

generating, by the one or more processors via a first model trained with machine learning on reference patterns of images, a feature map that identifies a predetermined pattern in an image frame of the plurality of image frames that corresponds to a zone on the platform on which to land the aerial vehicle;

inputting, by the one or more processors, responsive to recognition of the predetermined pattern from the image frame, the feature map generated by the first model into a second model trained with machine learning on slope-intercept functions according to an angular offset between features of the predetermined pattern, to output an orientation of the aerial vehicle relative to the zone;

determining, by the one or more processors, based on an offset of the zone in the image frame and the orientation output by the second model fed from the first model of the aerial vehicle relative to the zone, a vector between the aerial vehicle and the zone; and providing for display, by the one or more processors via a display device communicatively coupled to a computing system, an indication of the vector overlayed on a digital representation of the image frame.

11. The method of claim 10, comprising:

presenting, by the one or more processors via the display device, an indication of the predetermined pattern in the image frame;

receiving, by the one or more processors, via an input device communicatively coupled to the computing system, a confirmation of identification of the predetermined pattern; and generating, by the one or more processors, the vector based on the receipt of the confirmation.

12. The method of claim 10, comprising:

identifying, by the one or more processors and based on the plurality of image frames, a second moving vehicle, the second moving vehicle comprising the platform;

determining, by the one or more processors, a velocity of the second moving vehicle; and generating, by the one or more processors, the vector based on the velocity.

13. The method of claim 10, comprising:

identifying, by the one or more processors, a landing site designation of the platform;

determining, by the one or more processors, based on the landing site designation, information comprising at least one of a geographic location of a landing site, an identification code for the landing site, or a weight limit of the landing site; and outputting, by the one or more processors via the display device, the information.

14. The method of claim 10, comprising:

storing, by the one or more processors, a first representation of a dimension of the predetermined pattern at a first elevation from the platform;

receiving, by the one or more processors, a second representation of the dimension of the predetermined pattern at a second elevation from the platform; and determining, by the one or more processors, the second elevation from the platform based on a difference between the second representation of the dimension and the first representation the dimension of the predetermined pattern.

15. The method of claim 10, comprising:

determining, by the one or more processors, a first elevation based on a weight on wheels (WOW) sensor;

storing, by the one or more processors, a first representation of a dimension of the predetermined pattern at the first elevation;

receiving, by the one or more processors, a second representation of the dimension of the predetermined pattern at a second elevation from the platform; and determining, by the one or more processors, the second elevation from the platform based on a difference between the second representation of the dimension and the first representation the dimension of the predetermined pattern.

16. The method of claim 10, comprising:

navigating, by the one or more processors, the aerial vehicle to the platform based on the vector.

17. An aerial vehicle, comprising:

a computing system comprising one or more processors, coupled with memory, to:

receive, via a camera coupled to the aerial vehicle, a plurality of image frames captured by the camera of a platform on which to land the aerial vehicle;

generate, via a first model trained with machine learning on reference patterns of images, a feature map that identifies a predetermined pattern in an image frame of the plurality of image frames that corresponds to a zone on the platform on which to land the aerial vehicle;

input, responsive to recognition of the predetermined pattern from the image frame, the feature map generated by the first model into a second model trained with machine learning on slope-intercept functions according to an angular offset between features of the predetermined pattern, to output an orientation of the aerial vehicle relative to the zone;

determine, based on an offset of the zone in the image frame and the orientation output by the second model fed from the first model of the aerial vehicle relative to the zone, a vector between the aerial vehicle and the zone; and provide, for display via a display device communicatively coupled to the computing system, an indication of the vector overlayed on a digital representation of the image frame.

18. The aerial vehicle of claim 17, comprising the one or more processors to:

present, via the display device, an indication of the predetermined pattern in the image frame;

receive, via an input device communicatively coupled to the computing system, a confirmation of the identification of the predetermined pattern; and generate the vector based on the receipt of the confirmation.

19. The aerial vehicle of claim 17, comprising the one or more processors to:

identify, based on the plurality of image frames, a second moving vehicle, the second moving vehicle comprising the platform;

determine a velocity of the second moving vehicle; and generate the vector based on the velocity.

20. The aerial vehicle of claim 17, comprising the one or more processors to:

generate, based on the vector, a control signal to cause the aerial vehicle to descend towards the platform;

generate, subsequent to the generation of the control signal, a second vector between the aerial vehicle and the platform;

compare a difference between the vector and the second vector to a threshold, the threshold corresponding to a predefined descent rate; and generate a second control signal based on the comparison of the difference.

* * * * *